(12) United States Patent
Comer et al.

(10) Patent No.: US 9,098,316 B2
(45) Date of Patent: Aug. 4, 2015

(54) ROUTING FUNCTION CALLS TO SPECIFIC-FUNCTION DYNAMIC LINK LIBRARIES IN A GENERAL-FUNCTION ENVIRONMENT

(75) Inventors: Alyson Ann Comer, Endicott, NY (US); Gregory Raymond Fallon, Leeming (AU)

(73) Assignee: International Business Machines Corporation, Armonk, NY (US)

( * ) Notice: Subject to any disclaimer, the term of this patent is extended or adjusted under 35 U.S.C. 154(b) by 1632 days.

(21) Appl. No.: 12/234,779

(22) Filed: Sep. 22, 2008

(65) Prior Publication Data

US 2010/0077411 A1 Mar. 25, 2010

(51) Int. Cl.
G06F 9/44 (2006.01)
G06F 9/46 (2006.01)
G06F 9/445 (2006.01)

(52) U.S. Cl.
CPC .................................. G06F 9/44521 (2013.01)

(58) Field of Classification Search
CPC .................................................. G06F 9/44521
See application file for complete search history.

(56) References Cited

U.S. PATENT DOCUMENTS

| | | | |
|---|---|---|---|
| 5,797,015 A | 8/1998 | Daniels, Jr. et al. | |
| 7,100,172 B2 | 8/2006 | Voellm et al. | |
| 2005/0081184 A1 | 4/2005 | Deedwaniya et al. | |
| 2006/0284834 A1* | 12/2006 | Itkowitz et al. | ............... 345/156 |
| 2007/0006202 A1 | 1/2007 | Mikkelsen et al. | |
| 2007/0220502 A1 | 9/2007 | Asselin et al. | |
| 2007/0220508 A1 | 9/2007 | Thoelke | |
| 2007/0288913 A1 | 12/2007 | Chou et al. | |

OTHER PUBLICATIONS

John Dumais; Forwarding DLLs Add Functions to Existing Software; Oct. 1, 2000; 8 pages.*

* cited by examiner

*Primary Examiner* — H S Sough
*Assistant Examiner* — Kimberly Jordan
(74) *Attorney, Agent, or Firm* — Thomas E Tyson; Mark P Kahler

(57) ABSTRACT

A method and system for routing a function call to a core dynamic link library (DLL) via a pass-through DLL. An indication that an application requires a specific functionality is received. Using the indication, an initialization function internal to the pass-through DLL identifies a core DLL as providing the specific functionality. The core DLL is loaded into a memory. The pass-through DLL calls an internal processing initialization function included in the core DLL. The pass-through DLL receives and stores an address of a list of pointers that reference a set of functions included in the core DLL. The pass-through DLL receives a function call to a first function in the set of functions. The pass-through DLL calls the first function by utilizing the address of the list of pointers to identify a pointer that references the first function in the set of functions.

4 Claims, 11 Drawing Sheets

ROUTING FUNCTION CALLS TO SPECIFIC-FUNCTION DYNAMIC LINK LIBRARIES IN A GENERAL-FUNCTION ENVIRONMENT

FIELD OF THE INVENTION

The present invention relates to a data processing method and system for routing function calls to specific-function dynamic link libraries in a general-function environment, and more particularly to routing function calls to selected specific-function dynamic link libraries via a pass-through dynamic link library.

BACKGROUND OF THE INVENTION

In conventional systems, introducing a new set of functions that behave differently from an original set of functions included in a dynamic link library includes providing a new dynamic link library name or providing the functions in the new set with names that are different from the functions in the original set. These conventional schemes necessitate extensive changes to applications that need to utilize the new set of functions. For example, an application may need to be recompiled to utilize the new set of functions. Besides being time-consuming and expensive to implement, the aforementioned required changes pose a risk of causing the application to malfunction (i.e., by introducing a software bug). Thus, there exists a need to overcome at least one of the preceding deficiencies and limitations of the related art.

SUMMARY OF THE INVENTION

The present invention provides a computer-implemented method of routing a function call to a core dynamic link library (DLL) via a pass-through DLL. A computing system receives an indication that an application requires a specific functionality. An initialization function internal to a pass-through DLL included in the computing system identifies a first core DLL as providing the required specific functionality. Identifying the first core DLL includes selecting the first core DLL from a set of core DLLs based on the received indication. The first core DLL is loaded into a memory coupled to the computing system. The pass-through DLL calls an internal processing initialization function included in the first core DLL. In response to the call of the internal processing initialization function, the pass-through DLL receives and stores an address of a list of pointers that reference a set of functions included in the first core DLL. The set of functions includes a first function. From the application, the pass-through DLL receives a function call to the first function. The pass-through DLL calls the first function in response to receiving the function call. Calling the first function includes utilizing the address of the list of pointers to identify a pointer included in the list of pointers. The identified pointer references the first function in the set of functions. In response to the pass-through DLL calling the first function, the first function is executed.

A system, computer program product, and process for supporting computing infrastructure corresponding to the above-summarized method are also described and claimed herein.

DETAILED DESCRIPTION OF THE INVENTION

Overview

The present invention provides a method and system for routing a software application's function call via a pass-through dynamic link library (DLL) to a function included in a core DLL. The core DLL is selected from multiple core DLLs according to functionality required by the application. In one embodiment, the pass-through DLL allows an application to exploit a system's new functionality through the same application programming interface the application uses to exploit old functionality. For example, the new functionality may provide additional or restricted processing to comply with standards. A new function may be added to the pass-through DLL to allow the application to indicate which functionality (e.g., old functionality or new functionality) is required. The DLL that provides the old functionality is renamed and identified as one of the multiple core DLLs. Another core DLL provides the new functionality. The original name of the DLL that provides the old functionality is given to the pass-through DLL, thereby allowing an application to continue to use the original name and the same application programming interface while exploiting either the old or the new functionality.

Pass-Through DLL-Based System for Routing Function Calls

Figure 1:
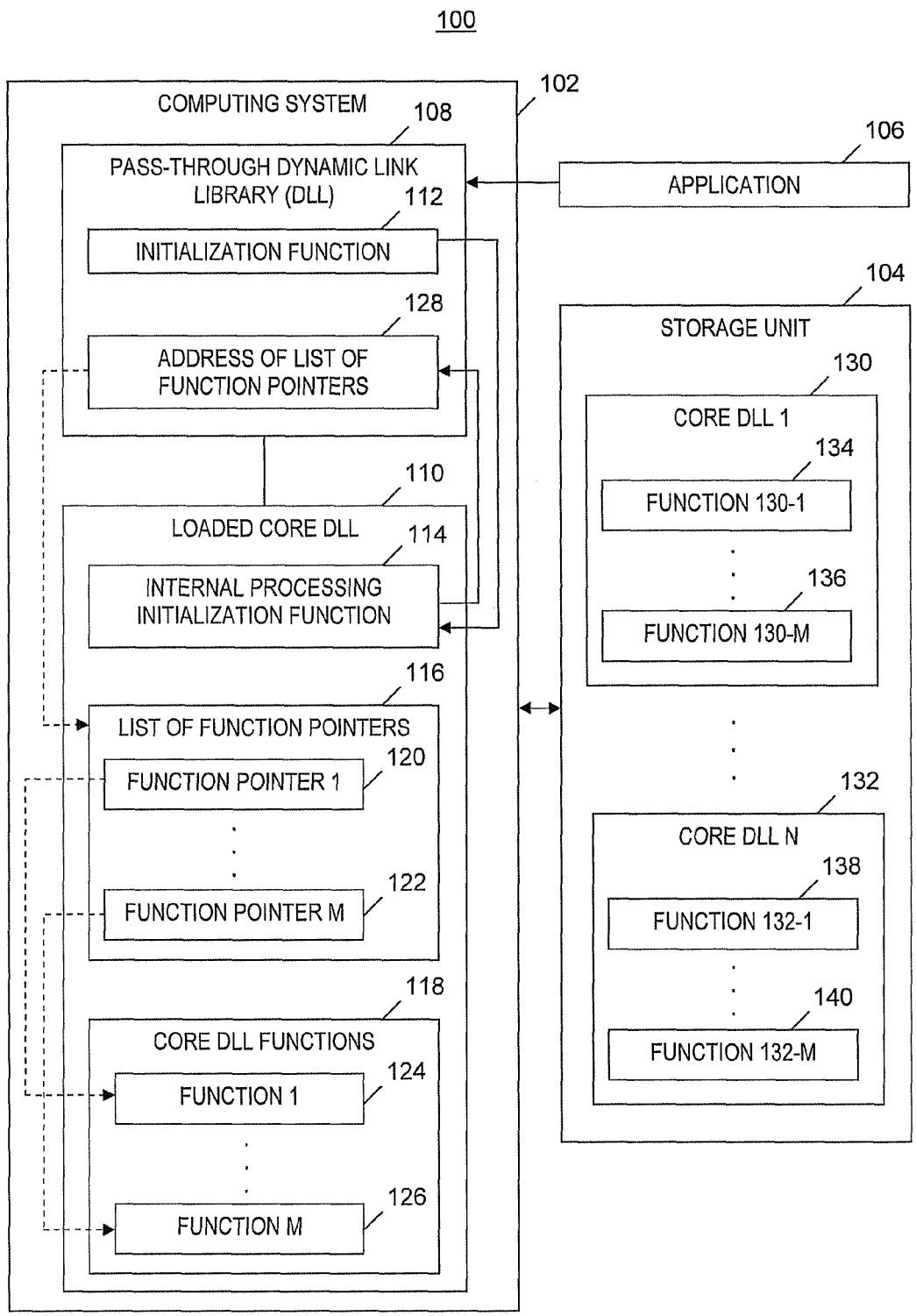
FIG. 1 is a block diagram of a system for routing function calls to a core DLL via a pass-through DLL, in accordance with embodiments of the present invention.

FIG. 1 is a block diagram of a system for routing function calls to a core DLL via a pass-through DLL, in accordance with embodiments of the present invention. System 100 includes a computing system 102, a computer data storage unit 104 (e.g., direct access storage device) and a software application 106 that is executing on computing system 102 or another computing system (not shown).

Computing system includes a pass-through DLL 108 and a core DLL 110 (a.k.a. loaded core DLL) that is loaded into a memory or virtual storage of computing system 102. Pass-through DLL 108 includes an initialization function 112 that calls an internal processing initialization function 114 internal to loaded core DLL 110. Loaded core DLL 110 also includes a list of function pointers 116. The list of function pointers 116 reference one or more core DLL functions 118, which are one or more functions included in loaded core DLL 110. The list of function pointers 116 includes M function pointers: function pointer 1, . . . , function pointer M (i.e., function pointer 120, . . . , function pointer 122). The core DLL functions 118 include M functions: function 1, . . . , function M (i.e., function 124, . . . , function 126). Function pointer 1, . . . , function pointer M reference function 1, . . . , function M, respectively. An address 128 (a.k.a. address of the list of function pointers) is returned to the pass-through DLL 108 by the call by initialization function 112 to internal processing initialization function 114. The address 128 references the list of function pointers 116. Internal processing initialization function 114 may also perform any initialization required by the loaded core DLL 110.

In one embodiment, pass-through DLL 108 includes a function to receive indication of specific functionality (not shown) that may receive an indication from application 106 that the application requires a specific functionality provided by one of the N core DLLs in storage unit 104. The function to receive indication of specific functionality also calls initialization function 112.

Storage unit 104 includes N core DLLs: core DLL 1, . . . , core DLL N (i.e., core DLL 130, . . . , core DLL 132). Each of the N core DLLs in storage unit 104 includes M functions: core DLL function 1, . . . core DLL function m, such that an i-th core DLL function of one core DLL of the N core DLLs in storage unit 104 has the same name as the i-th core DLL function of any other core DLL of the N core DLLs. Core DLL 1 includes function 130-1, . . . , function 130-M (i.e., function 134, . . . , function 136). Core DLL N includes function 132-1, . . . , function 132-M (i.e. function 138, . . . , function 140). Although not shown in FIG. 1, the internal processing initialization function 114 is included in each of the N core DLLs in storage unit 104.

Pass-through DLL 108 also includes M wrapper functions (not shown) that have the same names as the M core DLL functions included in core DLL functions 118. A wrapper function in pass-through DLL 108 checks if a list of function pointers 116 is known to pass-through DLL 108 and calls one of the M functions in core DLL functions 118 based on the called function having the same name as the wrapper function. In an alternate embodiment, the wrapper function selects the function to be called based on the ordinal position of the function to be called within core DLL functions 118 matching the ordinal position of the wrapper function within the M wrapper functions.

A call of initialization function 112 identifies one of the N core DLLs in storage unit 104 as the core DLL that provides the functionality required by application 106. The identified core DLL is loaded into memory or virtual storage of computing system 102. After being loaded, the identified core DLL is loaded core DLL 110. For example, if the execution of initialization function 112 identifies core DLL 130 as the core DLL that provides the functionality required by application 106, then core DLL 130 is loaded into memory or virtual storage of computing system 102. Thus, in the example of this paragraph, loaded core DLL 110 is core DLL 130 and the M functions included in core DLL 110 (i.e., function 124, . . . , function 126) are the M functions included in core DLL 130 (i.e., function 134, . . . , function 136).

The functionality of the components of system 100 is further described below relative to FIGS. 2A-2C, FIG. 3 and FIG. 4.

Pass-Through DLL-Based Process for Routing Function Calls

Figure 2A:
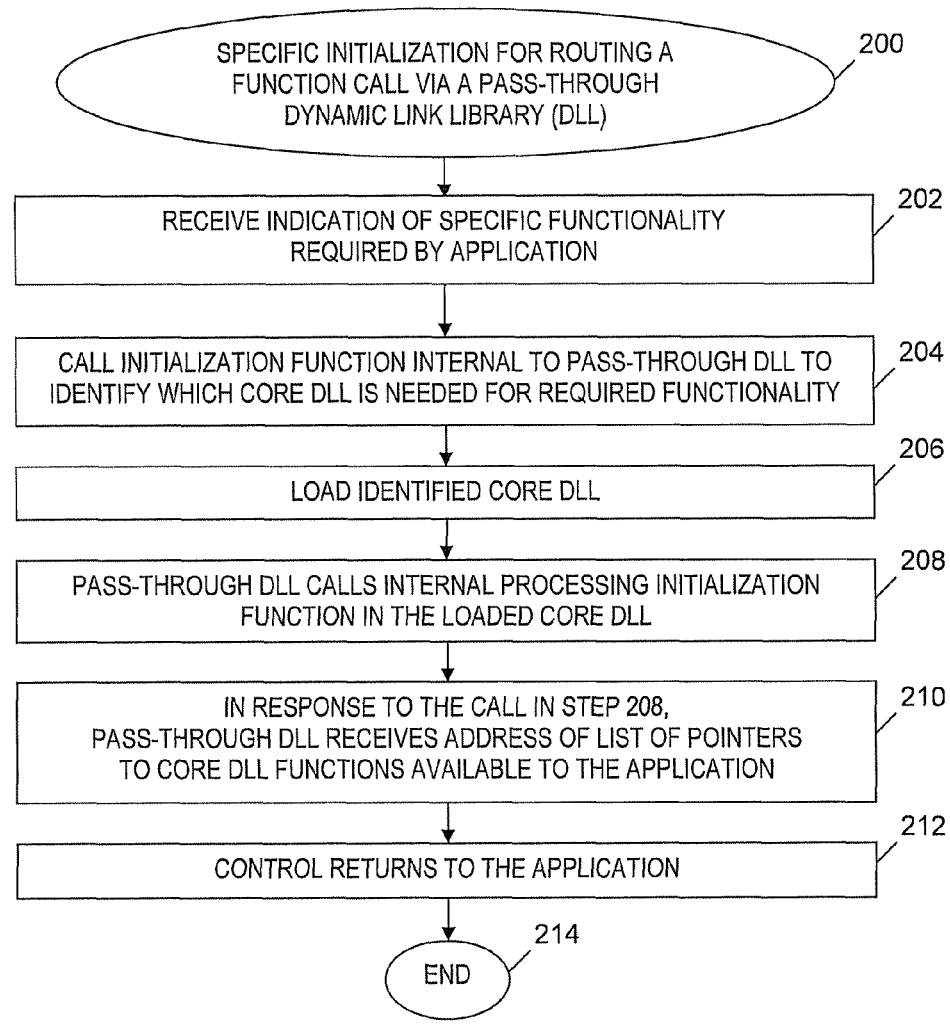
FIG. 2A is a flowchart of a specific initialization process for routing a function call via a pass-through DLL that is implemented in the system of FIG. 1, in accordance with embodiments of the present invention.

FIG. 2A is a flowchart of a specific initialization process for routing a function call via a pass-through DLL that is implemented in the system of FIG. 1, in accordance with embodiments of the present invention. The specific initialization process starts at step 200. In step 202, computing system 102 (see FIG. 1) receives an indication that application 106 (see FIG. 1) requires a specific functionality provided by one of the N core DLLs (i.e., core DLL 130, . . . , core DLL 132) stored in storage unit 104 (see FIG. 1). In one embodiment, a function to receive indication of specific functionality is included in pass-through DLL 108 (see FIG. 1) and in step 202 receives the indication that the application requires the specific functionality. In step 204, pass-through DLL 108 calls initialization function 112 (see FIG. 1) to identify which of the N core DLLs in storage unit 104 (see FIG. 1) is needed to provide the specific functionality required by application 106 (see FIG. 1).

In one alternate embodiment, pass-through DLL 108 (see FIG. 1) receives the aforementioned indication via an environment variable. In another alternate embodiment, pass-through DLL 108 (see FIG. 1) receives the aforementioned indication via a configuration file that provides information necessary to load the required core DLL from the storage unit 104 (see FIG. 1).

After identifying the core DLL needed to provide the specific functionality, the initialization function 112 (see FIG. 1) loads (in step 206) the identified core DLL into a memory or virtual storage coupled to computing system 102 (see FIG. 1). In response to the loading performed in step 206, the identified core DLL becomes the loaded core DLL 110 of FIG. 1.

In step 208, the pass-through DLL 108 (see FIG. 1) calls internal processing initialization function 114 (see FIG. 1), which returns an address 128 (see FIG. 1) of the list of function pointers 116 (see FIG. 1). In one embodiment, the aforementioned function to receive indication of specific functionality is included in pass-through DLL 108 (see FIG. 1) and calls initialization function 112 (see FIG. 1), which in turn calls internal processing initialization function 114 (see FIG. 1). In step 210, pass-through DLL 108 (see FIG. 1) receives and stores the address 128 (see FIG. 1) being returned by internal processing initialization function 114 (see FIG. 1). The list of function pointers 116 (see FIG. 1) point to core DLL functions 118 (see FIG. 1) included in loaded core DLL 110 (see FIG. 1). In step 212, control returns to application 106 (see FIG. 1) and the specific initialization process ends at step 214. Subsequent to the completion of the specific initialization process of FIG. 2A, application 106 (see FIG. 1) makes a core DLL function call. As used herein, a core DLL function call is defined as a call of one of the functions in core DLL functions 118 (see FIG. 1) (i.e., a call of one of the functions included in function 1, . . . , function M of FIG. 1). The routing of the core DLL function call is described below relative to FIG. 2C.

Figure 2B:
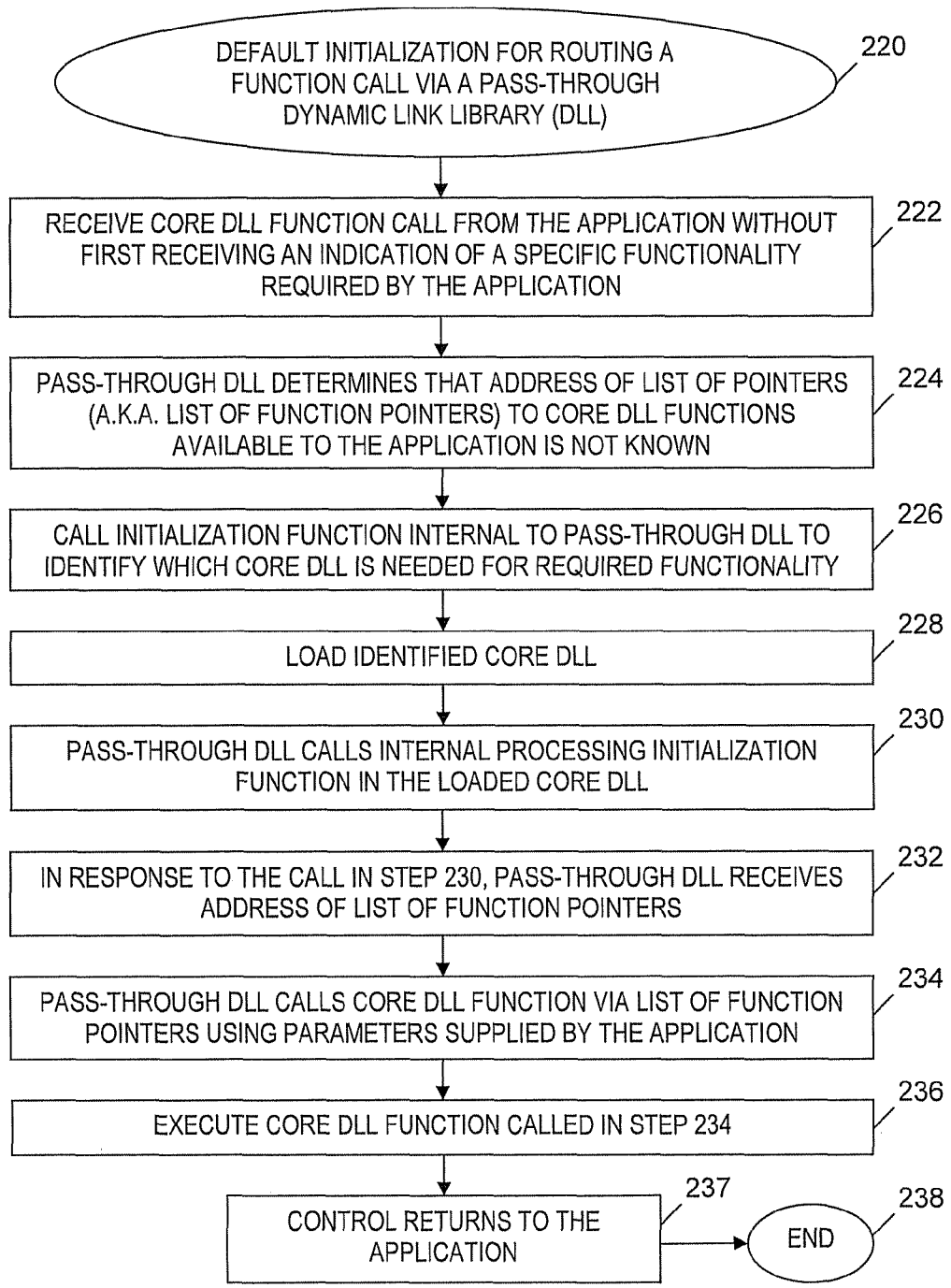
FIG. 2B is a flowchart of a default initialization process for routing a function call via a pass-through DLL that is implemented in the system of FIG. 1, in accordance with embodiments of the present invention.

FIG. 2B is a flowchart of a default initialization process for routing a function call via a pass-through DLL that is implemented in the system of FIG. 1, in accordance with embodiments of the present invention. The default initialization process begins at step 220. In step 222, computing system 102 (see FIG. 1) receives a core DLL function call from application 106 (see FIG. 1) without previously receiving an indication from application 106 (see FIG. 1) that application 106 (see FIG. 1) requires a specific functionality provided by one of the N core DLLs stored in storage unit 104 (see FIG. 1). The core DLL function call received in step 222 calls a core DLL function included in core DLL functions 118 (see FIG. 1). Application 106 (see FIG. 1) requires that the core DLL function called in step 222 provide a default functionality provided by a particular core DLL.

In step 224, a wrapper function in pass-through DLL 108 (see FIG. 1) that has the same name as the core DLL function called in step 222 determines that the pass-through DLL has no knowledge of address 128 (see FIG. 1). In the remaining discussion of FIG. 2B, the wrapper function that has the same name as the core DLL function called in step 222 is also referred to as "the aforementioned wrapper function." In step 226, the aforementioned wrapper function in pass-through DLL 108 (see FIG. 1) initiates the default initialization process by calling initialization function 112 (see FIG. 1) to identify the core DLL in storage unit 104 (see FIG. 1) that provides the default functionality required by application 106 (see FIG. 1).

After identifying the core DLL needed to provide the default functionality, the initialization function 112 (see FIG. 1) loads (in step 228) the core DLL identified in step 226 into a memory or virtual storage coupled to computing system 102 (see FIG. 1). In response to the loading performed in step 228, the core DLL identified in step 226 becomes the loaded core DLL 110 of FIG. 1.

In step 230, the initialization function 112 (see FIG. 1) calls internal processing initialization function 114 (see FIG. 1) in loaded core DLL 110 (see FIG. 1), which returns the address 128 (see FIG. 1) of the list of function pointers 116 (see FIG. 1). In step 232, in response to the call of the internal processing initialization function 114 (see FIG. 1) in step 230, pass-through DLL 108 (see FIG. 1) receives and stores the address 128 (see FIG. 1).

In step 234, the aforementioned wrapper function in pass-through DLL 108 (see FIG. 1) calls the core DLL function called in step 222 via the list of function pointers 116 (see FIG. 1). That is, the pass-through DLL selects and utilizes a pointer from list of function pointers 116 (see FIG. 1) that references the core DLL function called in step 222. The pass-through DLL selects the pointer from the list of function pointers 116 (see FIG. 1) based on the name (or index) of the core DLL function being called in step 222 matching the name (or index) of the aforementioned wrapper function. The pass-through DLL may also use one or more parameters in the call of the core DLL function in step 234. The parameter(s) are supplied to the pass-through DLL by application 106 (see FIG. 1).

In step 236, computing system 102 executes the core DLL function called in step 234. In step 237, control is returned to application 106 (see FIG. 1) and the process of FIG. 2B ends at step 238.

Figure 2C:
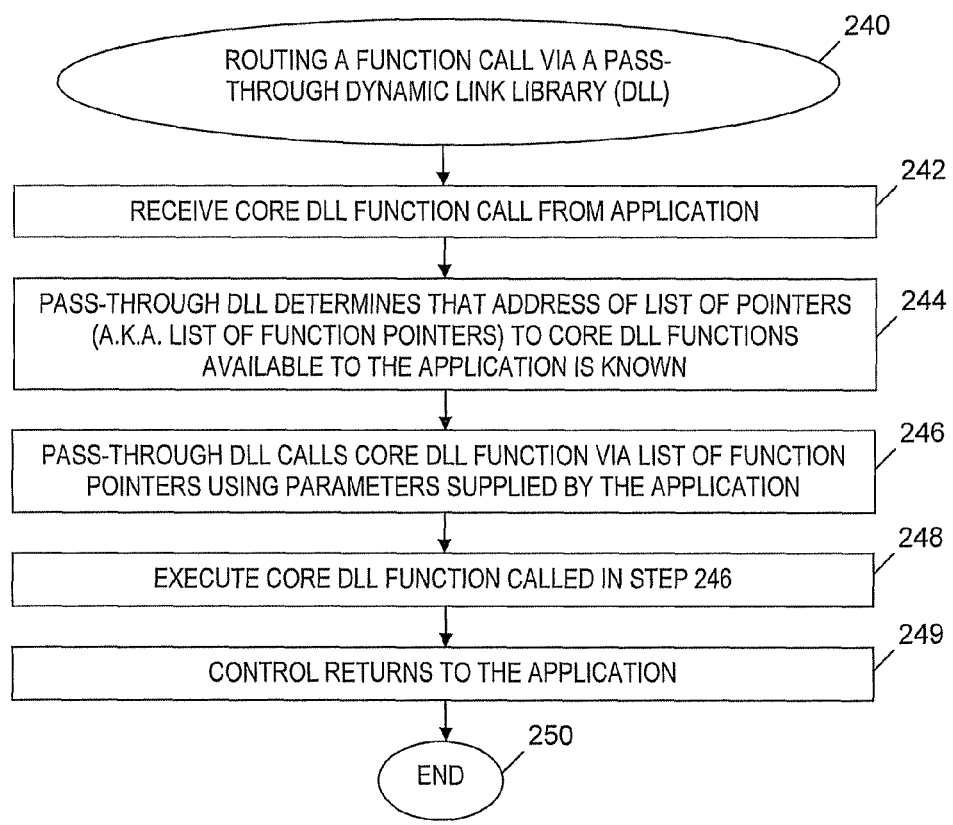
FIG. 2C is a flowchart of a pass-through DLL-based function call routing process that is implemented in the system of FIG. 1, in accordance with embodiments of the present invention.

FIG. 2C is a flowchart of a pass-through DLL-based function call routing process that is implemented in the system of FIG. 1, in accordance with embodiments of the present invention. The pass-through DLL-based call routing process starts at step 240 with the condition that either the specific initialization process of FIG. 2A or the default initialization process of FIG. 2B has been completed prior to step 240.

In step 242, pass-through DLL 108 (see FIG. 1) receives a core DLL function call from application 106 (see FIG. 1). Hereinafter, in this section, the function called in step 242 is also referred to as "the required core DLL function."

In step 244, a wrapper function in pass-through DLL 108 (see FIG. 1) determines that the pass-through DLL has knowledge of address 128 (see FIG. 1). In the remaining discussion of FIG. 2C, the wrapper function in the pass-through DLL that makes the determination in step 244 is referred to simply as "the wrapper function." In step 246, the wrapper function in pass-through DLL 108 (see FIG. 1) calls the required core DLL function via the list of function pointers 116 (see FIG. 1). That is, the pass-through DLL selects and utilizes a pointer from list of function pointers 116 (see FIG. 1) that references the required core DLL function. The pass-through DLL selects the pointer from the list of function pointers 116 (see FIG. 1) based on the name (or index) of the core DLL function being called in step 242 matching the name (or index) of the wrapper function. The pass-through DLL may also use one or more parameters in the call of the required core DLL function in step 246. The parameter(s) are supplied to the pass-through DLL by application 106 (see FIG. 1).

In step 248, computing system 102 executes the required core DLL function in response to the call in step 246. In step 249, control is returned to application 106 (see FIG. 1) and the process for routing a function call via a pass-through DLL ends at step 250.

After step 250, the process of FIG. 2C may be repeated for subsequent core DLL function calls.

Setting Up Pass-Through and Core DLLs

Figure 3:
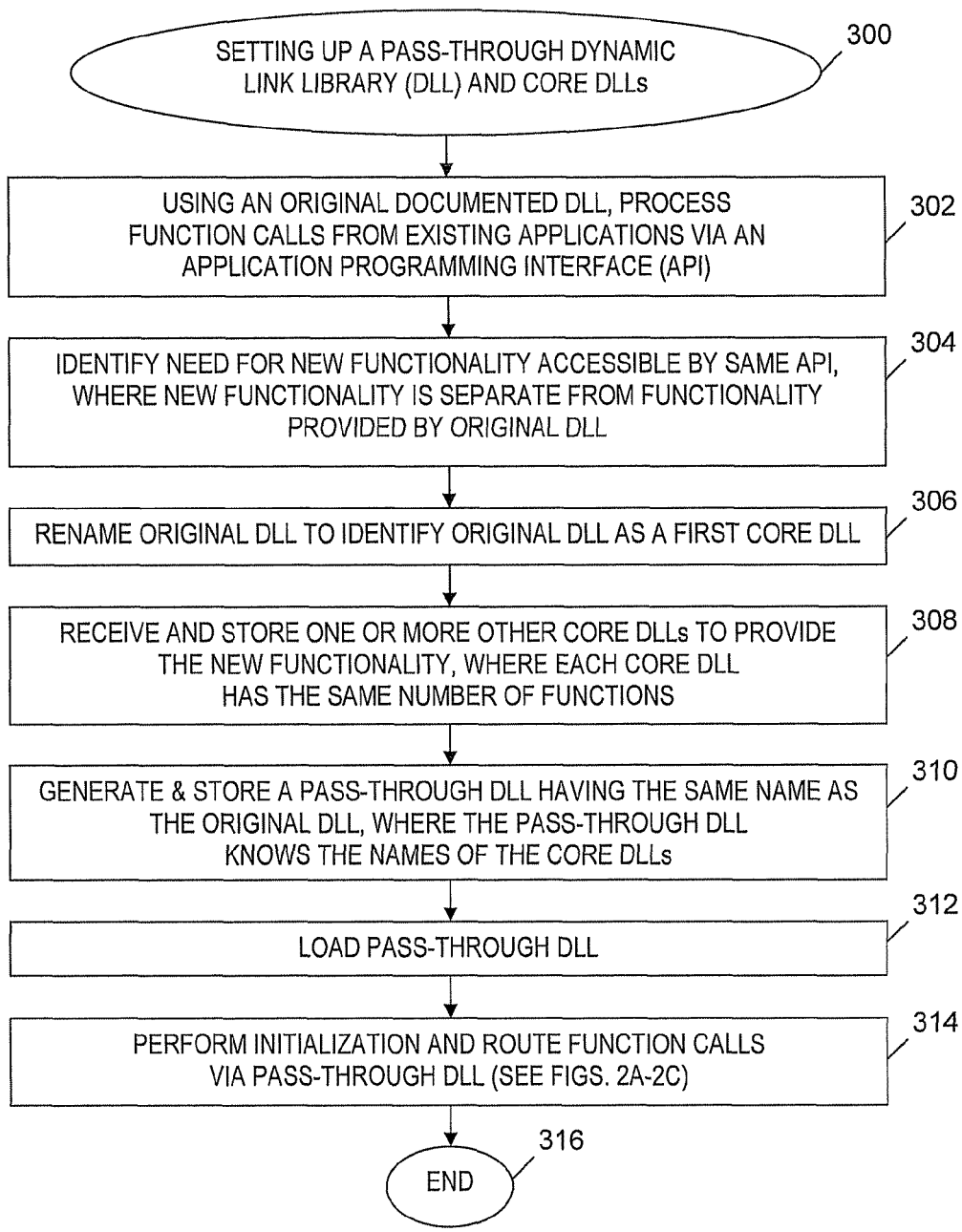
FIG. 3 is a flowchart of a process of setting up a pass-through DLL and core DLLs used in the processes of FIGS. 2A, 2B and 2C, in accordance with embodiments of the present invention.

FIG. 3 is a flowchart of a process of setting up a pass-through DLL and core DLLs used in the processes of FIGS. 2A-2C, in accordance with embodiments of the present invention. The pass-through DLL and core DLL setup process starts at step 300. In step 302, manual processing and computing system 102 (see FIG. 1) process function calls from existing applications (e.g., application 106 of FIG. 1) via an application programming interface (API). The computing system 102 (see FIG. 1) uses an original documented DLL (a.k.a. original DLL) to provide the functionality needed by the existing applications. The API of the original DLL includes functions that provide the functionality needed by the existing applications. In step 304, manual processing and computing system 102 (see FIG. 1) identify an application's need for new functionality that is accessible via the same API. The new functionality identified in step 304 is different and separate from the functionality provided by the original DLL.

In step 306, manual processing and computing system 102 (see FIG. 1) rename the original DLL to identify the original DLL as a first core DLL (e.g., core DLL 1 of FIG. 1) stored in storage unit 104 (see FIG. 1). In one embodiment, computing system 102 stores the new name of the original DLL in storage unit 104 (see FIG. 1).

In step 308, manual processing and computing system 102 (see FIG. 1) receive and store one or more other core DLLs (e.g., core DLL N of FIG. 1) to provide the new functionality identified in step 304. The one or more other core DLLs are stored in storage unit 104.

In step 310, manual processing and computing system 102 (see FIG. 1) set up a pass-through DLL having the same name as the original DLL had prior to step 306. The pass-through DLL is configured to have knowledge of the name of the first core DLL (i.e., the new name of the original DLL) and the one or more names of the one or more other core DLLs received and stored in step 308. That is, the pass-through DLL is generated to include wrapper functions having the same names as the names of the functions that formed the API of the original DLL. The pass-through DLL is generated in step 310 to include initialization function 112 (see FIG. 1). In one embodiment, the pass-through DLL is generated in step 310 to also include a function to receive indication of specific functionality as described above relative to FIG. 1. Computing system 102 (see FIG. 1) stores the pass-through DLL in a storage unit (e.g., storage unit 104 of FIG. 1). In step 312, computing system 102 (see FIG. 1) loads the pass-through DLL set up in step 310 into a memory or virtual storage coupled to computing system 102 (see FIG. 1). The pass-through DLL stored in the memory or virtual storage is pass-through DLL 108 (see FIG. 1).

In step 314, computing system 102 performs specific and default initializations as needed, and routes function calls via pass-through DLL 108 (see FIG. 1) as described above relative to FIGS. 2A-2C. The process of FIG. 3 ends at step 316.

FIG. 3 describes the process for the initial implementation of system 100 (see FIG. 1). If system 100 (see FIG. 1) requires one or more additional core DLLs at a future point in time, the pass-through DLL may require minimal changes in order to recognize when to use the one or more additional core DLLs.

Dynamically Changing Function Call Routing

Figure 4:
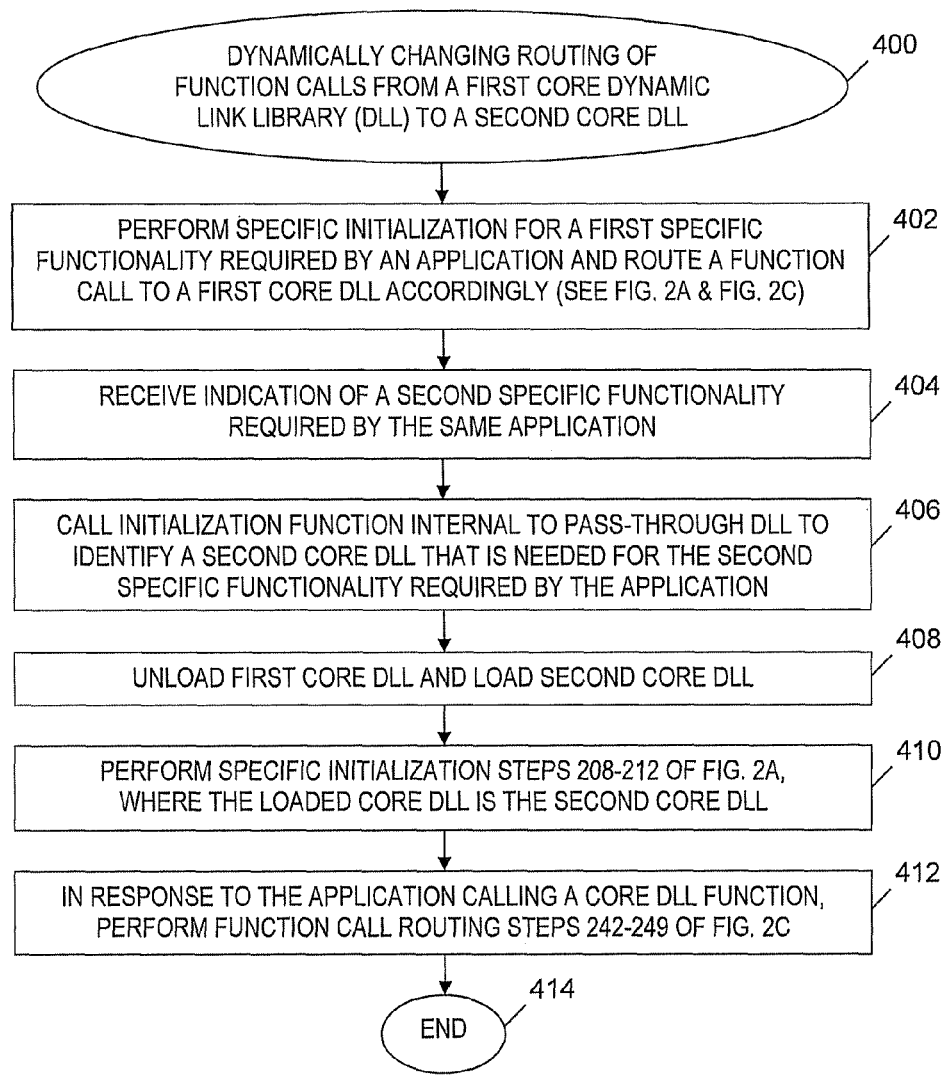
FIG. 4 is a flowchart of a process of dynamically changing the routing of function calls that includes performing the processes of FIG. 2A and FIG. 2C, in accordance with embodiments of the present invention.

FIG. 4 is a flowchart of a process of dynamically changing the routing of function calls that includes performing the processes of FIG. 2A and FIG. 2C, in accordance with embodiments of the present invention. The dynamic function call routing change process begins at step 400. In step 402, computing system 102 (see FIG. 1) performs (1) steps 202-212 of FIG. 2A to complete a specific initialization for a first specific functionality that is required by application 106 (see FIG. 1) and (2) steps 242-248 of FIG. 2C to route a first function call to a first core DLL (e.g., core DLL 1 of FIG. 1) that provides the first specific functionality.

In step 404, computing system 102 (see FIG. 1) receives an indication that application 106 (see FIG. 1) requires a second specific functionality which is different from the first specific functionality. In step 406, pass-through DLL 108 (see FIG. 1) calls initialization function 112 (see FIG. 1) to identify a second core DLL (e.g., core DLL N of FIG. 1) that provides the second specific functionality. The second core DLL is different from the first core DLL.

In step 408, computing system 102 (see FIG. 1) unloads the first core DLL from the memory or virtual storage used in step 206 (see FIG. 2A). Step 408 also includes the computing system 102 (see FIG. 1) loading the second core DLL into the aforementioned memory or virtual storage. In step 410, computing system 102 (see FIG. 1) performs steps 208-212 of FIG. 2A to complete an initialization for the second specific functionality with the second core DLL being the loaded core DLL. Subsequent to performing step 410, application 106 (see FIG. 1) calls another core DLL function that provides the second specific functionality (i.e., application 106 of FIG. 1 performs a second function call). In step 412, in response to the second function call, computing system 102 (see FIG. 1) performs steps 242-249 of FIG. 2C to route the second function call to the second core DLL, thereby completing a dynamic change of the routing of function calls from the first core DLL to the second core DLL. The process of FIG. 4 ends at step 414.

Sample Address of a List of Function Pointers

Figure 5:
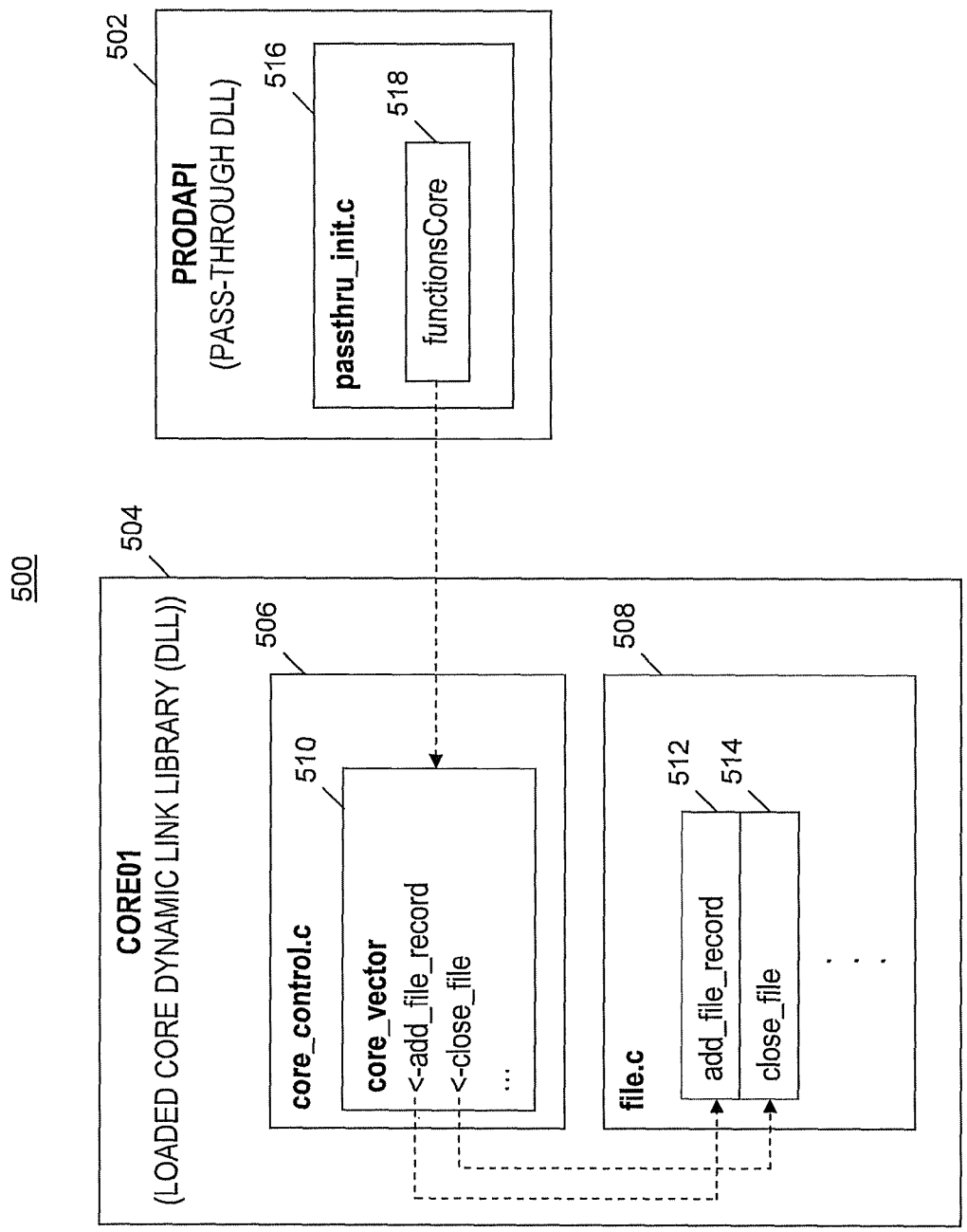
FIG. 5 is a block diagram illustrating an exemplary address of a list of function pointers that is utilized in the processes of FIGS. 2A, 2B and 2C, in accordance with embodiments of the present invention.

FIG. 5 is a block diagram illustrating an exemplary address of a list of function pointers that is utilized in the processes of FIGS. 2A, 2B and 2C, in accordance with embodiments of the present invention. Example 500 includes a pass-through DLL 502 and a core DLL 504 loaded from storage unit 104 (see FIG. 1) into a memory or virtual storage coupled to computing system 102 (see FIG. 1). Pass-through DLL 502 is named PRODAPI and core DLL 504 is named CORE01. CORE01 includes a first component 506 (i.e., core_control.c) and a second component 508 (i.e., file.c) that includes actual functions. The file.c component includes functions such as an add_file_record function 512 and a close_file function 514.

Each function in file.c that is part of the formal API is referenced by a corresponding function pointer included in a list of function pointers 510 (i.e., core_vector), which is included in core_control.c. For example, the add_file_record pointer in core_vector references the add_file_record function 512 and the close_file pointer in core_vector references the close_file function 514.

The same core_control.c component having the same list of function pointers (i.e., core_vector) is included in every core DLL stored in storage unit 104 (see FIG. 1). Each list of function pointers included in the core DLLs stored in storage unit 104 (see FIG. 1) reference the functions that are available to external callers (e.g., application 106 of FIG. 1). Any two of the aforementioned lists of function pointers included in the core DLLs stored in storage unit 104 (see FIG. 1) have the same number of function pointers. Further, corresponding entries in the aforementioned lists of function pointers have identical formats. An entry in a first list of function pointers addresses a first function that has the same name as a second function addressed by a corresponding entry in a second list of function pointers, but the first function may provide a different functionality from the second function.

Pass-through DLL 502 includes an initialization component 516 (i.e., passthru.init.c). During initialization in the process of FIG. 2A or FIG. 2B, the address to the list of function pointers 510 is assigned to a pointer 518 (i.e., functionsCore) that resides in the pass-through DLL 502.

Since core DLL 504 is the core DLL that was selected from the core DLLs in storage unit 104 (see FIG. 1) and loaded, functionsCore addresses list 510 that includes pointers to functions included in core DLL 504.

Specific Initialization

Figure 6:
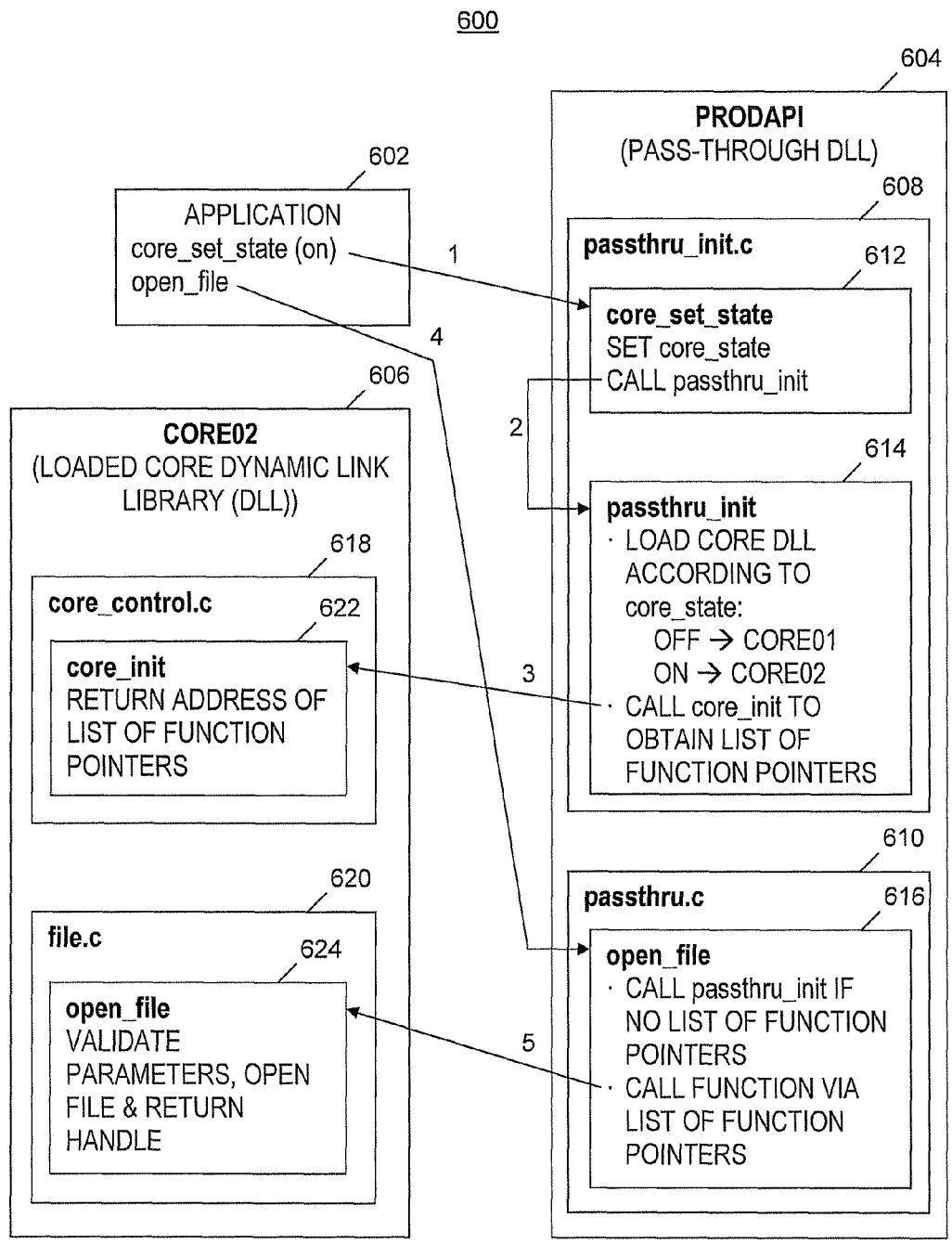
FIG. 6 is a block diagram illustrating an exemplary specific initialization included in the process of FIG. 2A, in accordance with embodiments of the present invention.

FIG. 6 is a block diagram illustrating an exemplary specific initialization included in the process of FIG. 2A, in accordance with embodiments of the present invention. Example 600 includes an application 602, a pass-through DLL 604 (i.e., PRODAPI), and a loaded core DLL 606 (i.e., CORE02). Application 602 uses functionality of a system that implements the API provided by PRODAPI. Pass-through DLL 604 includes an initialization component 608 (i.e., passthru_init.c) and a function calling component 610 (i.e., passthru.c). The passthru_init.c component includes a function 612 to receive indication of specific functionality (i.e., core_set_state) and a private initialization function 614 (i.e., passthru_init). The passthru.c component includes a pass-through function 616 (i.e., a wrapper function) that initiates the opening of a file.

Core DLL 606 includes a first component 618 (i.e., core_control.c) and a second component 620 (i.e., file.c). The core_control.c component includes an internal processing initialization function 622 (i.e., core_init). The file.c component includes a function 624 (i.e., open_file) and may include one or more other functions (not shown). Core DLL 606 provides specific functionality that application 602 requires (e.g., additional processing to comply with a standards organization).

In example 600, application 602 indicates its need for a specific set of functionality via a call to the core_set_state function (i.e., function 612) (see arrow 1 in FIG. 6). The core_set_state function sets an indicator (i.e., core_state) to indicate the specific functionality that is required by application 602 and that is provided by one of the core DLLs. In alternate embodiments, the need for a specific set of functionality is indicated by environment variables or by external configuration files. The core_set_state function then calls the private function 614 (i.e., a function internal to pass-through DLL 604) passthru_init to complete the initialization (i.e., specific initialization) for the specific set of functionality (see arrow 2 in FIG. 6).

From storage unit 104 (see FIG. 1), the passthru_init function retrieves (1) a first core DLL (i.e., CORE01) if the core_state is set to "OFF" or (2) a second core DLL (i.e., CORE02) if the core_state is set to "ON". In example 600, core_state is set to "ON" and therefore CORE02 is loaded (see core DLL 606).

The passthru_init function in the pass-through DLL 604 then calls core_init within core DLL 606 (see arrow 3 in FIG. 6). The core_init function is used only internally by pass-through DLL 604. Further, the core_init function returns the address of CORE02's list of function pointers (e.g. list 510 in FIG. 5) to pass-through DLL 604 and the returned address is stored in a pointer (e.g. functionsCore in FIG. 5). Control then returns to pass-through DLL 604 and then to application 602, thereby completing the call to core_set_state.

After completing the call to core_set_state, application 602 starts using the API provided by the system that implements PRODAPI. Application 602 initiates the opening of a file by calling open_file within pass-through DLL 604 (see arrow 4 in FIG. 6). The corresponding open_file function 616 in pass-through DLL 604 checks to ensure that the aforementioned address of the list of function pointers is known by the pass-through DLL. The open_file function 616 then calls the open_file function 624 in the loaded core DLL 606 with parameters supplied as-is by application 602 (see arrow 5 in FIG. 6).

The open_file function 624 in the core DLL 606 is executed by computing system 102 (see FIG. 1) to complete the opening of the file. The execution of open_file function 624 includes validating the parameters included with the call to function 624, opening the file, and returning the corresponding file handle.

Default Initialization

Figure 7:
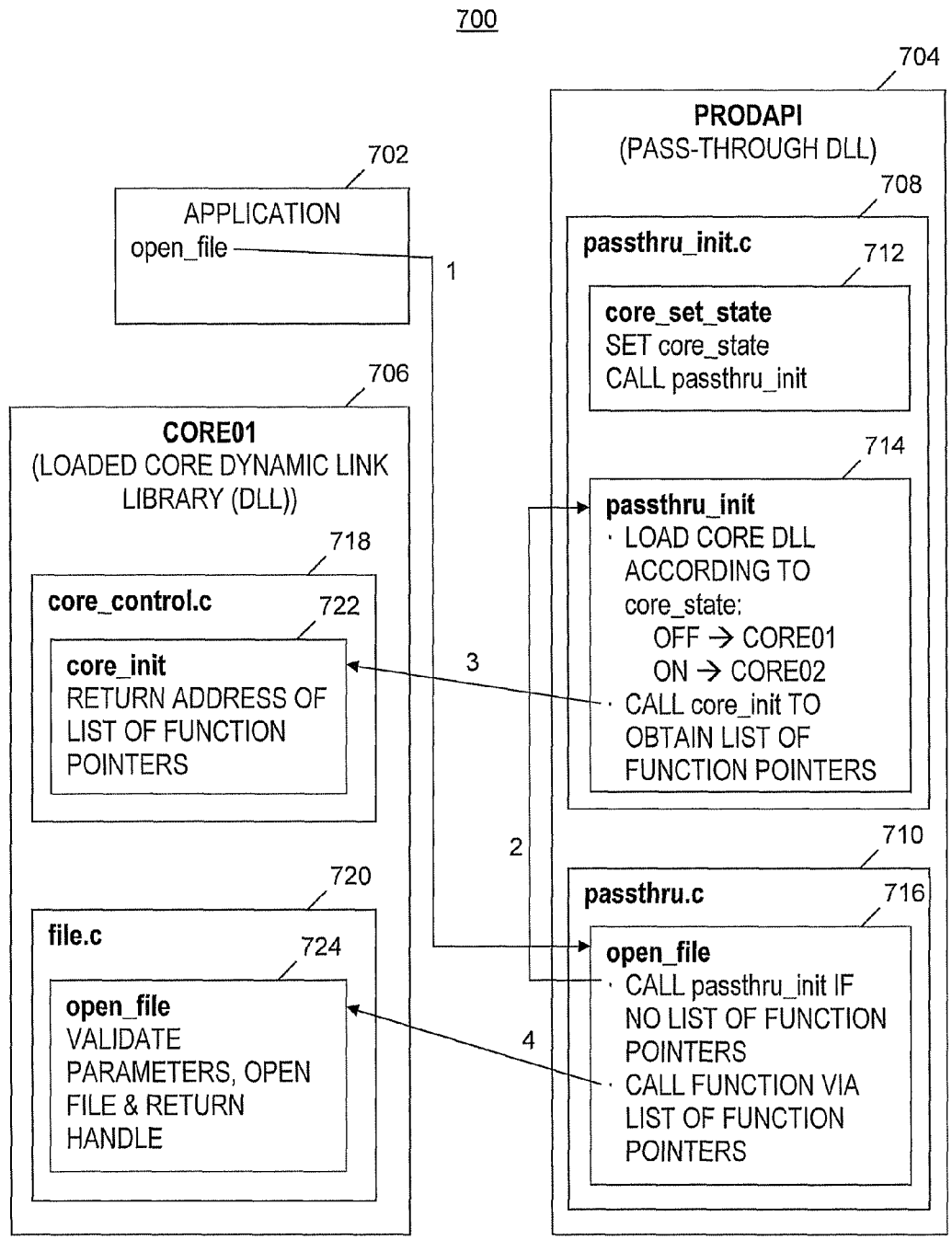
FIG. 7 is a block diagram illustrating an exemplary default initialization included in the process of FIG. 2B, in accordance with embodiments of the present invention.

FIG. 7 is a block diagram illustrating an exemplary default initialization included in the process of FIG. 2B, in accordance with embodiments of the present invention. Example 700 includes an application 702, a pass-through DLL 704 (i.e., PRODAPI) and a loaded core DLL 706 (i.e., CORE01). Application 702 uses functionality of a system that implements the API provided by PRODAPI. Pass-through DLL 704 includes an initialization component 708 (i.e., passthru_init.c) and a function calling component 710 (i.e., passthru.c). The passthru_init.c component includes a function 712 to receive indication of specific functionality (i.e., core_set_state) and a private initialization function 714 (i.e., passthru_init). The passthru.c component includes a pass-through function 716 (i.e., a wrapper function) that initiates the opening of a file.

Core DLL 706 includes a first component 718 (i.e., core_control.c) and a second component 720 (i.e., file.c). The core_control.c component includes an internal processing initialization function 722 (i.e., core_init). The file.c component includes a function 724 (i.e., open_file).

In example 700, application 702 is to run using a default functionality that had been used in previous versions of the application. The first function called by application 702 is open_file (see arrow 1 in FIG. 7). Pass-through function 716 detects that CORE01's list of function pointers is not known to pass-through DLL 704 and in response, calls the private function 714 (i.e., passthru_init; see arrow 2 in FIG. 7).

The global indicator core_state is set to "OFF" in example 700, and therefore the passthru_init function retrieves the core DLL CORE01 (i.e., the default core DLL) from storage unit 104 (see FIG. 1) and loads the default core DLL in memory or virtual storage (see loaded core DLL 706).

The passthru_init function in the pass-through DLL 704 then calls core_init within core DLL 706 (see arrow 3 in FIG. 7). The core_init function is used only internally by pass-through DLL 704. Further, the core_init function returns the address of CORE01's list of function pointers (e.g., list 510 in FIG. 5) to pass-through DLL 704 and the returned address is stored in a pointer (e.g. functionsCore 518 in FIG. 5). Using a function pointer in CORE01's list of function pointers that addresses the open_file function 724, the wrapper function 716 calls the open_file function 724 with parameters supplied as-is by application 702 (see arrow 4 in FIG. 7).

The open_file function 724 in the core DLL 706 is executed by computing system 102 (see FIG. 1). The execution of open_file function 724 includes validating the parameters included with the call to function 724, opening the file, and returning the corresponding file handle.

Subsequent Function Calls

Figure 8:
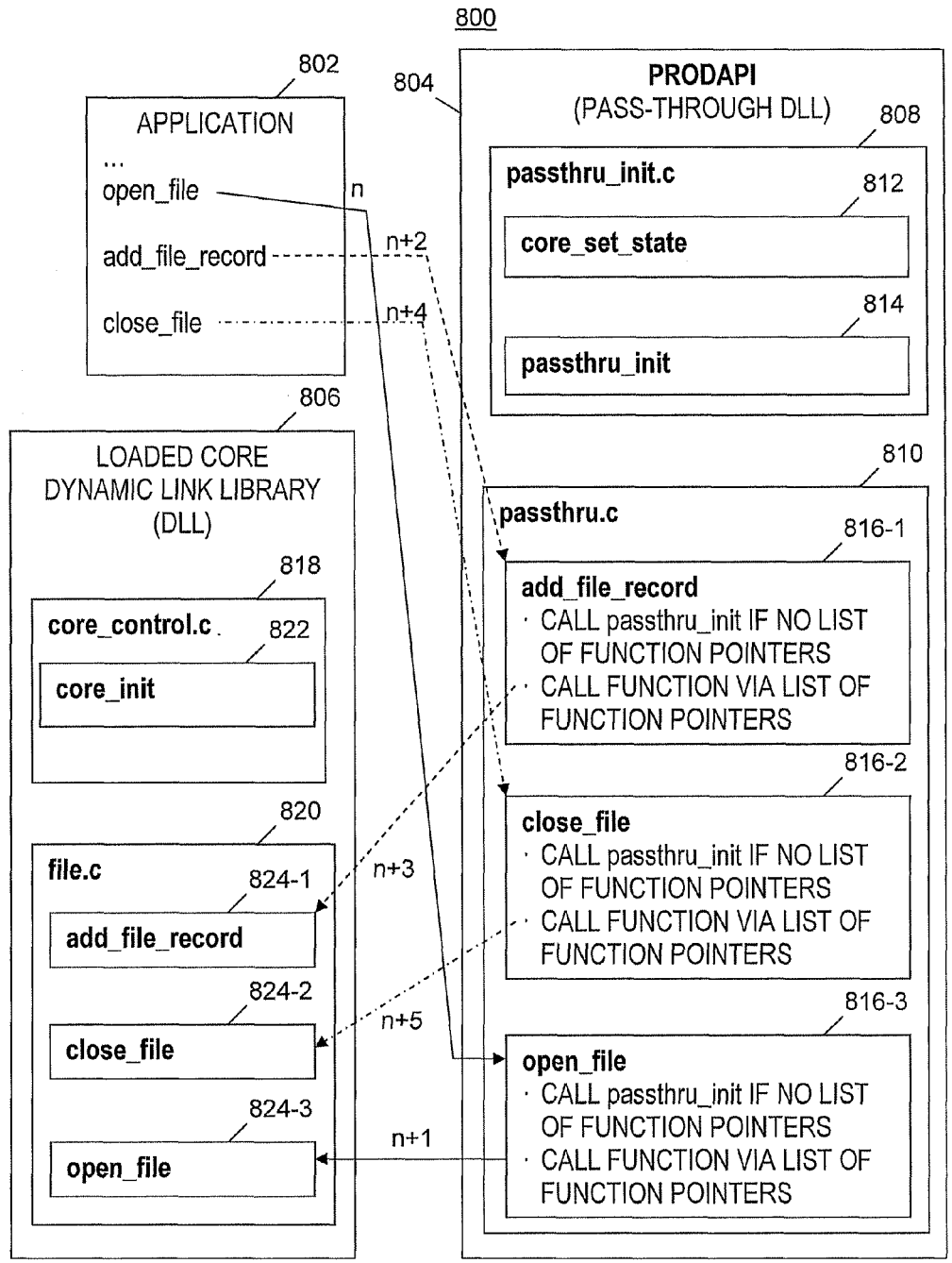
FIG. 8 is a block diagram illustrating examples of function calls that occur subsequent to the specific initialization of FIG. 6 or the default initialization of FIG. 7, in accordance with embodiments of the present invention.

FIG. 8 is a block diagram illustrating examples of function calls that occur subsequent to the specific initialization of FIG. 6 or the default initialization of FIG. 7, in accordance with embodiments of the present invention. The steps in example 800 are performed after a specific initialization (see, e.g., example 600 of FIG. 6) or after a default initialization (see, e.g., example 700 of FIG. 7) is completed. Because initialization has already occurred, the pass-through DLL has knowledge of the core DLL's list of function pointers (a.k.a. the known list of function pointers), and each function in the pass-through DLL is simply looking up the address of a corresponding function in the loaded core DLL and calling that corresponding function. Unlike the initialization examples in FIG. 6 and FIG. 7, other functions such as core_init and passthru_init are not involved in the function calls in example 800.

Example 800 includes an application 802, a pass-through DLL 804 (i.e., PRODAPI) and a loaded core DLL 806. Application 802 uses functionality of a system that implements the API provided by PRODAPI. Core DLL 806 may be, for example, CORE01 (see core DLL 706 in FIG. 7) if example 800 is following a default initialization, or CORE02 (see core DLL 606 in FIG. 6) if example 800 is following a specific initialization. Pass-through DLL 804 includes an initialization component 808 (i.e., passthru_init.c) and a function calling component 810 (i.e., passthru.c). The passthru_init.c component includes a function 812 to receive indication of specific functionality (i.e., core_set_state) and a private initialization function 814 (i.e., passthru_init). The passthru.c component includes pass-through functions 816-1, 816-2 and 816-3 that initiate the adding of a record, the closing of a file, and the opening of a file, respectively.

Core DLL 806 includes a first component 818 (i.e., core_control.c) and a second component 820 (i.e., file.c). The core_control.c component includes an internal processing initialization function 822 (i.e., core_init). The file.c component includes functions 824-1, 824-2 and 824-3 (i.e., add_file_record, close_file and open_file, respectively).

The first function called by application 802 via function 816-3 is open_file (see arrow n in FIG. 8). From the known list of function pointers, function 816-3 uses the function pointer that addresses the open_file function 824-3 to call the open_file function 824-3 with parameters supplied as-is by application 802 (see arrow n+1 in FIG. 8).

The second function called by application 802 via function 816-1 is add_file_record (see arrow n+2 in FIG. 8). From the known list of function pointers, function 816-1 uses the function pointer that addresses the add_file_record function 824-1 to call the add_file_record function 824-1 with parameters supplied as-is by application 802 (see arrow n+3 in FIG. 8).

The third function called by application 802 via function 816-2 is close_file (see arrow n+4 in FIG. 8). From the known list of function pointers, function 816-2 uses the function pointer that addresses the close_file function 824-2 to call the close_file function 824-2 with parameters supplied as-is by application 802 (see arrow n+5 in FIG. 8).

Computing System

Figure 9:
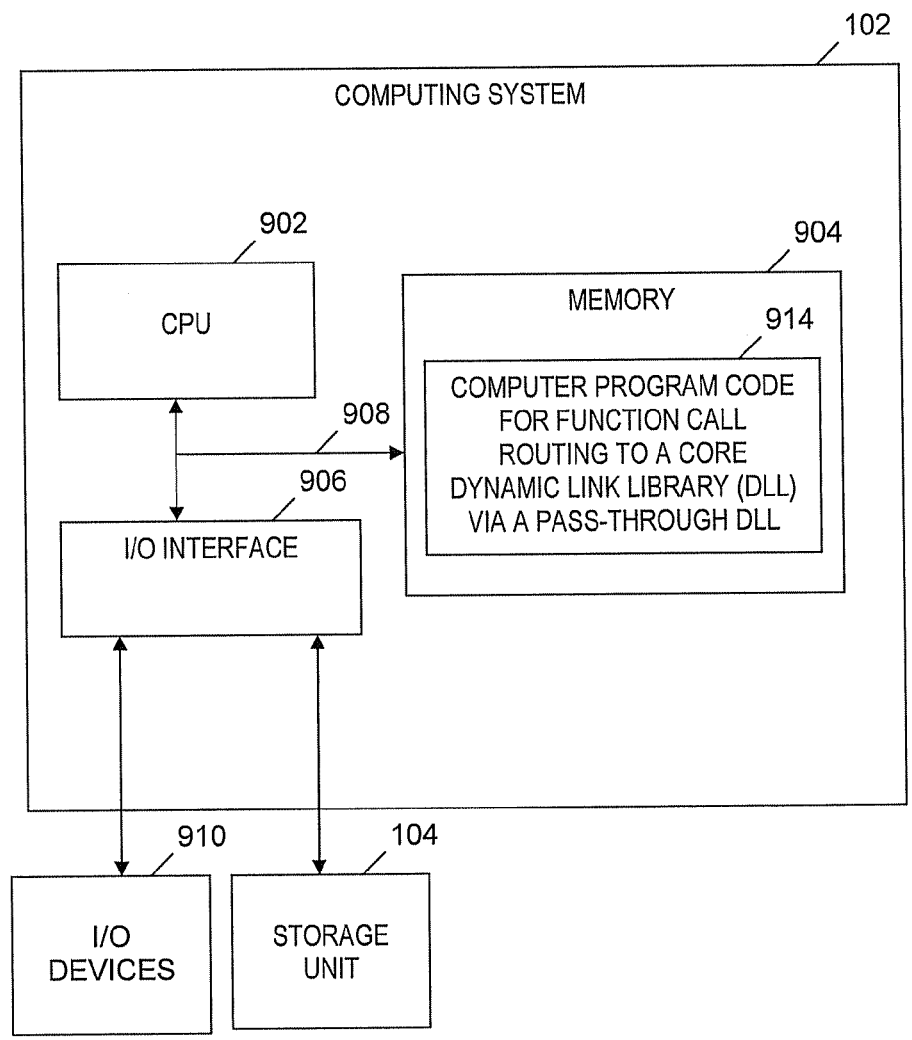
FIG. 9 is a block diagram of a computing system that is included in the system of FIG. 1 and that implements the processes of FIGS. 2A, 2B and 2C, in accordance with embodiments of the present invention.

FIG. 9 is a block diagram of a computing system that is included in the system of FIG. 1 and that implements the processes of FIGS. 2A-2C, FIG. 3 and FIG. 4 in accordance with embodiments of the present invention. Computing system 102 generally comprises a central processing unit (CPU) 902, a memory 904, an input/output (I/O) interface 906, and a bus 908. Further, computing system 102 is coupled to I/O devices 910 and the computer data storage unit 104. CPU 902 performs computation and control functions of computing system 102. CPU 902 may comprise a single processing unit, or be distributed across one or more processing units in one or more locations (e.g., on a client and server).

Memory 904 may comprise any known type of computer data storage and/or transmission media, including bulk storage, magnetic media, optical media, random access memory (RAM), read-only memory (ROM), a data cache, a data object, etc. In one embodiment, cache memory elements of memory 904 provide temporary storage of at least some program code in order to reduce the number of times code must be retrieved from bulk storage during execution. Moreover, similar to CPU 902, memory 904 may reside at a single physical location, comprising one or more types of data storage, or be distributed across a plurality of physical systems in various forms. Further, memory 904 can include data distributed across, for example, a local area network (LAN) or a wide area network (WAN).

I/O interface 906 comprises any system for exchanging information to or from an external source. I/O devices 910 comprise any known type of external device, including a display device (e.g., monitor), keyboard, mouse, printer, speakers, handheld device, facsimile, etc. Bus 908 provides a communication link between each of the components in computing system 102, and may comprise any type of transmission link, including electrical, optical, wireless, etc.

I/O interface 906 also allows computing system 102 to store and retrieve information (e.g., data or program instructions such as code 914) from an auxiliary storage device such as computer data storage unit 104 or another computer data storage unit (not shown). Computer data storage unit 104 may be a non-volatile storage device, such as a magnetic disk drive (i.e., hard disk drive) or an optical disc drive (e.g., a CD-ROM drive which receives a CD-ROM disk).

Memory 904 includes computer program code 914 that provides the logic for routing a function call via a pass-through DLL using specific or default initialization (e.g., the process of FIG. 2C together with FIG. 2A or FIG. 2B), setting up the pass-through and core DLLs (e.g., the process of FIG. 3), dynamically changing the routing of function calls from one core DLL to another core DLL (e.g., the process of FIG. 4). Further, memory 904 may include other systems not shown in FIG. 9, such as an operating system (e.g., Linux) that runs on CPU 902 and provides control of various components within and/or connected to computing system 102.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "system" (e.g., system 100 of FIG. 1 or computing system 102). Furthermore, the present invention may take the form of a computer program product embodied in any tangible medium of expression (e.g., memory 904 or computer data storage unit 104) having computer-usable program code (e.g., code 914) embodied in the medium.

Any combination of one or more computer-usable or computer-readable medium(s) (e.g., memory 904 and computer data storage unit 104) may be utilized. The computer-usable or computer-readable medium may be, for example but not limited to, an electronic, magnetic, optical, electromagnetic, infrared or semiconductor system, apparatus, device or propagation medium. A non-exhaustive list of more specific examples of the computer-readable medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program 914 is printed, as the program 914 can be electronically captured via, for instance, optical scanning of the paper or other medium, then compiled, interpreted, or otherwise processed in a suitable manner, if necessary, and then stored in a computer memory 904. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code (e.g., code 914) for carrying out operations of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer (e.g., computing system 102), partly on the user's computer, as a stand-alone software package, partly on the user's computer and partly on a remote computer or entirely on the remote computer or server. In the latter scenario, the remote computer may be connected to the user's computer through any type of network (not shown), including a LAN, a WAN, or the connection may be made to an external computer (e.g., through the Internet using an Internet Service Provider).

The present invention is described herein with reference to flowchart illustrations (e.g., FIGS. 2A-2C, FIG. 3 and FIG. 4) and/or block diagrams of methods, apparatus (systems) (e.g., FIG. 1 and FIG. 9), and computer program products according to embodiments of the invention. It will be understood that each block of the flowchart illustrations and/or block diagrams, and combinations of blocks in the flowchart illustrations and/or block diagrams, can be implemented by computer program instructions (e.g., code 914). These computer program instructions may be provided to a processor (e.g., CPU 902) of a general purpose computer (e.g., computing system 102), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium (e.g., memory 904 or computer data storage unit 104) that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer (e.g., computing system 102) or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Any of the components of the present invention can be deployed, managed, serviced, etc. by a service provider that offers to deploy or integrate computing infrastructure with respect to the method of routing a function call via a pass-through DLL using specific or default initialization. Thus, the present invention discloses a process for supporting computer infrastructure, comprising integrating, hosting, maintaining and deploying computer-readable code (e.g., code 914) into a computing system (e.g., computing system 102), wherein the code in combination with the computing system is capable of performing a method of routing a function call via a pass-through DLL using specific or default initialization.

In another embodiment, the invention provides a business method that performs the process steps of the invention on a subscription, advertising and/or fee basis. That is, a service provider, such as a Solution Integrator, can offer to create, maintain, support, etc. a method of routing a function call via a pass-through DLL using specific or default initialization. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIGS. 2A-2C, FIG. 3 and FIG. 4, and the block diagrams in FIG. 1 and FIG. 9 illustrate the architecture, functionality, and operation of possible implementations of systems, methods, and computer program products according to various embodiments of the present invention. In this regard, each block in the flowchart or block diagrams may represent a module, segment, or portion of code (e.g., code 914), which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of routing a function call to a core dynamic link library (DLL) via a pass-through DLL, the method comprising:

routing, by a computing system, one or more function calls from an application directly to one or more functions included in an original DLL without utilizing any pass-through DLL, wherein the one or more functions of the original DLL provide an original functionality;

in response to routing the one or more function calls, changing an original name of the original DLL to a second name that identifies the original DLL as a second core DLL;

in response to routing the one or more function calls, receiving and storing one or more core DLLs that include a first core DLL, wherein one or more functions are included in each core DLL of the one or more core DLLs, and wherein a number of the one or more functions included in the original DLL is identical to a number of the one or more functions in each core DLL of the one or more core DLLs;

in response to routing the one or more function calls, generating the pass-through DLL having the original name of the original DLL;

in response to generating the pass-through DLL, loading the pass-through DLL in a memory of the computing system;

receiving, by the computing system, an indication that the application requires a specific functionality;

in response to receiving the indication, identifying the first core DLL as providing the specific functionality, wherein identifying the first core DLL includes selecting the first core DLL from the one or more core DLLs based on the indication, and wherein identifying the first core DLL is performed by an initialization function internal to the pass-through DLL;

in response to identifying the first core DLL, loading the first core DLL into the memory in the computing system;

calling, by the pass-through DLL and in response to loading the first core DLL, an internal processing initialization function included in the first core DLL;

receiving and storing, by the pass-through DLL and in response to calling the internal processing initialization function included in the first core DLL, an address of a list of pointers that reference a plurality of functions included in the first core DLL, wherein the plurality of functions includes a first function;

receiving a first function call to the first function by the pass-through DLL and from the application ;

calling the first function by the pass-through DLL, subsequent to receiving and storing the address and in response to receiving the function call, wherein calling the first function includes utilizing the address to identify a pointer included in the list of pointers, and wherein the pointer references the first function in the plurality of functions; and executing the first function in response to calling the first function by the pass-through DLL;

receiving a second function call to a second function by the pass-through DLL, from the application, and without a prior receipt of an indication that the application requires a second functionality provided by the second core DLL of the one or more core DLLs;

determining that the pass-through DLL has no knowledge of the list of pointers or any other list of pointers that reference the one or more functions included in each core DLL of the one or more core DLLs;

in response to determining that the pass-through DLL has no knowledge of the list of pointers or any other list of pointers, identifying the second core DLL as providing the second functionality, wherein identifying the second core DLL includes selecting the second core DLL from the one or more core DLLs, and wherein identifying the second core DLL is performed by the initialization function internal to the pass-through DLL;

in response to identifying the second core DLL, loading the second core DLL into the memory;

calling, by the pass-through DLL and in response to loading the second core DLL, an internal processing initialization function included in the second core DLL;

receiving and storing, by the pass-through DLL and in response to calling the internal processing initialization function included in the second core DLL, a second address of a second list of pointers that reference a second plurality of functions included in the second core DLL, wherein the second plurality of functions includes the second function;

calling the second function by the pass-through DLL and in response to receiving the second address, wherein calling the second function includes utilizing the second address to identify a pointer included in the second list of pointers, and wherein the pointer included in the second list of pointers references the second function in the second plurality of functions, and;

executing the second function in response to calling the second function by the pass-through DLL.

2. A computing system comprising a processor and a computer-readable memory unit coupled to the processor, the memory unit containing instructions that when executed by the processor implement a method of routing a function call to a core dynamic link library (DLL) via a pass-through DLL, the method including:

routing one or more function calls from an application directly to one or more functions included in an original DLL without utilizing any pass-through DLL, wherein the one or more functions of the original DLL provide an original functionality;

in response to routing the one or more function calls, changing an original name of the original DLL to a second name that identifies the original DLL as a second core DLL;

in response to routing the one or more function calls, receiving and storing one or more core DLLs that include a first core DLL, wherein one or more functions are included in each core DLL of the one or more core DLLs, and wherein a number of the one or more functions included in the original DLL is identical to a number of the one or more functions in each core DLL of the one or more core DLLs;

in response to routing the one or more function calls, generating the pass-through DLL having the original name of the original DLL;

in response to generating the pass-through DLL, loading the pass-through DLL in a memory of the computing system;

receiving, by the computing system, an indication that the application requires a specific functionality;

in response to receiving the indication, identifying the first core DLL as providing the specific functionality, wherein identifying the first core DLL includes selecting the first core DLL from the one or more core DLLs based on the indication, and wherein identifying the first core DLL is performed by an initialization function internal to the pass-through DLL;

in response to identifying the first core DLL, loading the first core DLL into the memory in the computing system;

calling, by the pass-through DLL and in response to loading the first core DLL, an internal processing initialization function included in the first core DLL;

receiving and storing, by the pass-through DLL and in response to calling the internal processing initialization function included in the first core DLL, an address of a list of pointers that reference a plurality of functions included in the first core DLL, wherein the plurality of functions includes a first function;

receiving a first function call to the first function by the pass-through DLL and from the application;

calling the first function by the pass-through DLL, subsequent to receiving and storing the address and in response to receiving the function call, wherein calling the first function includes utilizing the address to identify a pointer included in the list of pointers, and wherein the pointer references the first function in the plurality of functions;

executing the first function in response to calling the first function by the pass-through DLL;

receiving a second function call to a second function by the pass-through DLL, from the application, and without a prior receipt of an indication that the application requires a second functionality provided by the second core DLL of the one or more core DLLs;

determining that the pass-through DLL has no knowledge of the list of pointers or any other list of pointers that reference the one or more functions included in each core DLL of the one or more core DLLs;

in response to determining that the pass-through DLL has no knowledge of the list of pointers or any other list of pointers, identifying the second core DLL as providing the second functionality, wherein identifying the second core DLL includes selecting the second core DLL from the one or more core DLLs, and wherein identifying the second core DLL is performed by the initialization function internal to the pass-through DLL;

in response to identifying the second core DLL, loading the second core DLL into the memory;

calling, by the pass-through DLL and in response to loading the second core DLL, an internal processing initialization function included in the second core DLL;

receiving and storing, by the pass-through DLL and in response to calling the internal processing initialization function included in the second core DLL, a second address of a second list of pointers that reference a second plurality of functions included in the second core DLL, wherein the second plurality of functions includes the second function;

calling the second function by the pass-through DLL and in response to receiving the second address, wherein calling the second function includes utilizing the second address to identify a pointer included in the second list of pointers, and wherein the pointer included in the second list of pointers references the second function in the second plurality of functions, and;

executing the second function in response to calling the second function by the pass-through DLL.

3. A computer program product, comprising a non-transitory computer-readable storage medium having a computer-readable program code stored therein, the computer-readable program code containing instructions configured to be executed by a processor of a computing system to implement a method of routing a function call to a core dynamic link library (DLL) via a pass-through DLL the method comprising:

routing one or more function calls from an application directly to one or more functions included in an original DLL without utilizing any pass-through DLL, wherein the one or more functions of the original DLL provide an original functionality;

in response to routing the one or more function calls, changing an original name of the original DLL to a second name that identifies the original DLL as a second core DLL;

in response to routing the one or more function calls, receiving and storing one or more core DLLs that include a first core DLL, wherein one or more functions are included in each core DLL of the one or more core DLLs, and wherein a number of the one or more functions included in the original DLL is identical to a number of the one or more functions in each core DLL of the one or more core DLLs;

in response to routing the one or more function calls, generating the pass-through DLL having the original name of the original DLL;

in response to generating the pass-through DLL, loading the pass-through DLL in a memory of the computing system;

receiving an indication that the application requires a specific functionality;

in response to receiving the indication, identifying the first core DLL as providing the specific functionality, wherein identifying includes selecting the first core DLL from the one or more core DLLs based on the indication, and wherein identifying is performed by an initialization function internal to the pass-through DLL;

in response to identifying the first core DLL, loading the first core DLL into the memory of the computing system;

calling, by the pass-through DLL and in response to loading the first core DLL, an internal processing initialization function included in the first core DLL;

receiving and storing, by the pass-through DLL and in response to calling the internal processing initialization function included in the first core DLL, an address of a list of pointers that reference a plurality of functions included in the first core DLL, wherein the plurality of functions includes a first function;

receiving a function call to the first function by the pass-through DLL and from the application;

calling the first function by the pass-through DLL, in response to receiving and storing the address and in response to receiving the function call, wherein calling the first function includes utilizing the address to identify a pointer included in the list of pointers, and wherein the pointer references the first function in the plurality of functions; and executing the first function in response to calling the first function by the pass-through DLL;

receiving a second function call to a second function by the pass-through DLL, from the application, and without a prior receipt of an indication that the application requires a second functionality provided by the second core DLL of the one or more core DLLs;

determining that the pass-through DLL has no knowledge of the list of pointers or any other list of pointers that reference the one or more functions included in each core DLL of the one or more core DLLs;

in response to determining that the pass-through DLL has no knowledge of the list of pointers or any other list of pointers, identifying the second core DLL as providing the second functionality, wherein identifying the second core DLL includes selecting the second core DLL from the one or more core DLLs, and wherein identifying the second core DLL is performed by the initialization function internal to the pass-through DLL;

in response to identifying the second core DLL, loading the second core DLL into the memory;

calling, by the pass-through DLL and in response to loading the second core DLL, an internal processing initialization function included in the second core DLL;

receiving and storing, by the pass-through DLL and in response to calling the internal processing initialization function included in the second core DLL, a second address of a second list of pointers that reference a second plurality of functions included in the second core DLL, wherein the second plurality of functions includes the second function;

calling the second function by the pass-through DLL and in response to receiving the second address, wherein calling the second function includes utilizing the second address to identify a pointer included in the second list of pointers, and wherein the pointer included in the second list of pointers references the second function in the second plurality of functions, and;

executing the second function in response to calling the second function by the pass-through DLL.

4. A computer-implemented method of routing a function call to a core dynamic link library (DLL) via a pass-through DLL, the method comprising:

routing, by a computing system, one or more function calls from an application directly to one or more functions included in an original DLL without utilizing any pass-through DLL, wherein the one or more functions of the original DLL provide an original functionality;

in response to routing the one or more function calls, changing an original name of the original DLL to a second name that identifies the original DLL as a second core DLL;

in response to routing the one or more function calls, receiving and storing one or more core DLLs that include a first core DLL, wherein one or more functions are included in each core DLL of the one or more core DLLs, and wherein a number of the one or more functions included in the original DLL is identical to a number of the one or more functions in each core DLL of the one or more core DLLs;

in response to routing the one or more function calls, generating the pass-through DLL having the original name of the original DLL;

in response to generating the pass-through DLL, loading the pass-through DLL in a memory of the computing system;

receiving, by the computing system, an indication that the application requires a specific functionality;

in response to receiving the indication, identifying the first core DLL as providing the specific functionality, wherein identifying the first core DLL includes selecting the first core DLL from the one or more core DLLs based on the indication, and wherein identifying the first core DLL is performed by an initialization function internal to the pass-through DLL;

in response to identifying the first core DLL, loading the first core DLL into the memory in the computing system;

calling, by the pass-through DLL and in response to loading the first core DLL, an internal processing initialization function included in the first core DLL;

receiving and storing, by the pass-through DLL and in response to calling the internal processing initialization function included in the first core DLL, an address of a list of pointers that reference a plurality of functions included in the first core DLL, wherein the plurality of functions includes a first function;

receiving a first function call to the first function by the pass-through DLL, and from the application;

calling the first function by the pass-through DLL, subsequent to receiving and storing the address and in response to receiving the function call, wherein calling the first function includes utilizing the address to identify a pointer included in the list of pointers, and wherein the pointer references the first function in the plurality of functions; and executing the first function in response to calling the first function by the pass-through DLL.

* * * * *